(No Model.)
H. D. HICKS.
BELT FASTENER.
No. 246,504. Patented Aug. 30, 1881.
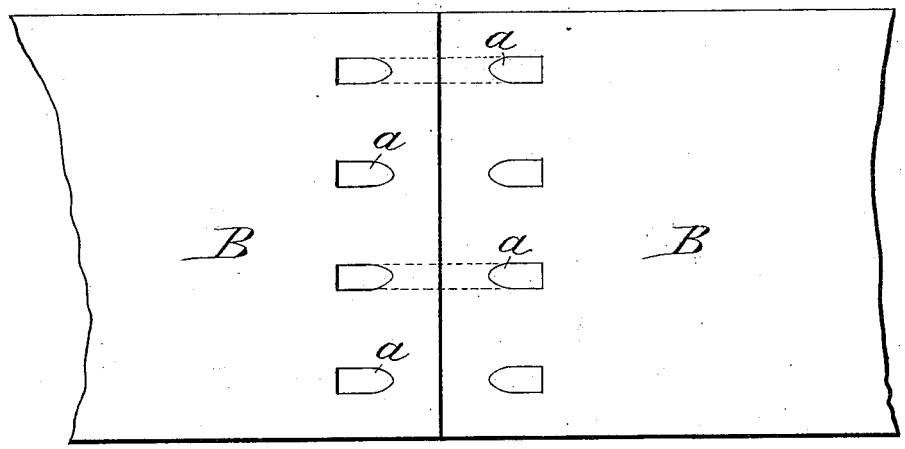
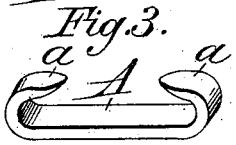
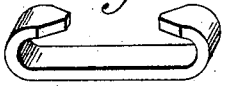
Attest:
F. H. Schott.
A. R. Brown.
Inventor:
Horace D. Hicks
per J. C. Tasknotty

UNITED STATES PATENT OFFICE.

HORACE D. HICKS, OF WHITEFIELD, NEW HAMPSHIRE, ASSIGNOR OF ONE-HALF TO THOMAS C. GREY, OF SAME PLACE.

BELT-FASTENER.

SPECIFICATION forming part of Letters Patent No. 246,504, dated August 30, 1881.

Application filed May 23, 1881. (No model.)

*To all whom it may concern:*

Be it known that I, HORACE D. HICKS, a citizen of the United States, residing at Whitefield, in the county of Coos and State of New Hampshire, have invented certain new and useful Improvements in Belt-Fasteners; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to belt-fasteners; and it consists in the peculiar form of a belt-fastening hook, whereby the opposite ends of power-belting are securely united without the usual liability to injurious strain incident to the use of ordinary fastening-hooks, as hereinafter more fully set forth.

In the annexed drawings, which fully illustrate the invention, Figure 1 is a plan view of the opposite ends of a belt united by means of my improved fastening-hooks. Fig. 2 is a longitudinal section. Fig. 3 is a view of the improved hook detached, and Fig. 4 is a view of the ordinary blunt hook.

The hooks heretofore employed as fastenings for uniting the ends of belting have been made either with blunt ends of nearly or quite even thickness with the body of the hook or have been provided with ends that are beveled or reduced in thickness upon the inner or under surface. The thick blunt ends, when passed through the usual openings in the belt and forced down upon the same, make a deep indentation in the substance of the belt, that seriously impairs its strength. They also project considerably on each side, even when forced down as far as practicable, and thus cause an injurious strain on the belt-joint every time the joint passes over a pulley or drum. If the ends of the hooks are flattened or beveled on the under surface, as has been sometimes practiced, the sharp edge which is thus left on that portion of the hook ends that come in contact with the belt is extremely liable to cut the belt.

These objections are entirely obviated in the construction of my improved hook, which consists of a suitable metallic plate or strip, A, the ends or points $a$ of which are reduced in thickness on their outer surface and beveled or rounded on each edge, so that when the sharpened ends of the hook are passed through the usual openings in the adjoining ends of the belt B and then forced down at right angles to the edges of the belt, or parallel with its surface, they will clinch the substance of the belt without cutting it or making such deep depressions.

The under surface of the hook being slightly convex and the bevel at the ends being upon the upper surface only, the sharp edge of the hook is prevented from coming in contact with the belt, and therefore is not liable to cut or otherwise injure the same.

It will also be observed that the bent ends of the fastenings, being reduced in thickness, will not project beyond the surface of the belt, and therefore offer no obstruction to the passage of the belt when the joint comes in contact with a pulley. The belts will thus run more smoothly and evenly, reducing the wear and tear to a minimum, and requiring much less than the ordinary amount of repairing.

I have found by experience in using my improved fastening-hook in places where heretofore lacings only could be used to advantage that the belt will run better and longer without requiring repairs than is possible with the very best lacing.

By my improved construction of belt-fastening hooks I can also advantageously employ a shorter hook, of increased thickness, and a less number, thus greatly reducing the time and expense of fitting and repairing belts. By reducing the length of the hook the joint of the belt passes over a pulley without straining the connection, and the belt becomes more like an endless belt than is possible by other similar devices.

I am aware that belt-fastening hooks have heretofore been made with beveled ends that are reduced in thickness upon the under surface, and therefore do not claim the same; but

What I claim as my invention is—

An improved belt-fastening, A, having hook ends *a a* beveled upon their outer surfaces and rounded to a point, so that the fastening, when applied to the ends of a belt, will not project above the surface of the stock, substantially as specified.

In testimony whereof I affix my signature in presence of two witnesses.

HORACE DAVID HICKS.

Witnesses:
FRANK D. BELL,
LORENZO D. WHITCHER.